United States Patent [19]
Saito et al.

[11] Patent Number: 5,227,124
[45] Date of Patent: Jul. 13, 1993

[54] METHOD AND STRUCTURE FOR PREVENTIVE MAINTAINING AN ELONGATED METAL HOLLOW MEMBER

[75] Inventors: Hideyo Saito; Koichi Kurosawa; Takayuki Numata, all of Hitachi; Shigeo Hattori, Ibaraki; Takenori Shindo, Kure, all of Japan

[73] Assignees: Hitachi, Ltd., Tokyo; Babcock-Hitachi Kabushiki Kaisha, Ibaraki; Hitachi Kyowa Kogyo Co., Ltd., Tokyo, all of Japan

[21] Appl. No.: 561,684

[22] Filed: Aug. 2, 1990

[30] Foreign Application Priority Data

Aug. 4, 1989 [JP] Japan .................................. 1-201181

[51] Int. Cl.$^5$ .............................................. G21C 19/00
[52] U.S. Cl. .................................... 376/260; 376/205; 376/305; 228/107
[58] Field of Search ............... 376/260, 205, 203, 305; 228/126, 133, 134, 107; 138/97, 98, 99; 285/397, 398

[56] References Cited

U.S. PATENT DOCUMENTS

| 4,513,903 | 4/1985 | Fieldstein et al. ................... 228/107 |
| 4,847,967 | 7/1989 | Gaudin ............................... 376/260 |

FOREIGN PATENT DOCUMENTS

| 56-82696 | 7/1981 | Japan . |
| 57-12458 | 8/1982 | Japan . |
| 59-18718 | 10/1984 | Japan . |
| 60-19958 | 10/1985 | Japan . |

Primary Examiner—Donald P. Walsh
Assistant Examiner—Frederick H. Voss
Attorney, Agent, or Firm—Antonelli, Terry, Stout et al.

[57] ABSTRACT

An ICM housing welded to a wall of a reactor pressure vessel in operation is provided with a molten metal layer containing 4 wt. % or more δ ferrite at a portion of an inner peripheral surface thereof which corresponds to a weld. A sleeve made of stainless steel is located at the competent portion of the inner peripheral surface of the ICM housing stainless steel so as to be molten by means of a TIG welding machine to form the molten metal layer. The molten metal layer prevents stress corrosion cracking of the ICM housing.

9 Claims, 9 Drawing Sheets

METHOD AND STRUCTURE FOR PREVENTIVE MAINTAINING AN ELONGATED METAL HOLLOW MEMBER

FIELD OF THE INVENTION

The present invention relates to a method and a structure for preventive maintenance of an elongated metal hollow member welded to a reactor pressure vessel (RPV) in operation, and more particularly, to a preventive maintenance method and a structure therefor which are capable of preventing occurrence of any stress corrosion cracking in a weld of a metal hollow member during operation, which cracking allows a coolant to leak out of the RPV.

BACKGROUND OF THE INVENTION

Examples of this kind of hollow member include an ICM housing for an incore monitor which serves to monitor the neutron flux generating in the RPV, and a control rod drive (CRD) housing for a control-rod drive which serves to drive the control rod.

The hollow member, e.g. the ICM housing, extends through a wall of the RPV into the coolant while it is welded to the wall of the RPV through a padding weld formed on an inner surface of the RPV wall. Such ICM housing is made of SUS304 stainless steel. In general, there exists in the weld a welding residual stress resulting from the welding heat input. Under the presence of the welding residual stress, corrosion proceeds markedly at the weld of the ICM housing in the coolant, resulting in cracking. This phenomenon is referred to as the stress corrosion cracking. Upon the occurrence of the stress corrosion cracking in the weld of the ICM housing, there is the possibility that the coolant leaks out of the RPV.

Once the stress corrosion cracking has occurred, repair may be conducted by a known method in which a shielding member is welded to the hollow member to surround the stress corrosion cracked portion as disclosed in JP-U-56-82696.

However, this kind of repairing method will add another new weld which is in danger of stress corrosion cracking. Further, this repairing method cannot be applied until the position where the stress corrosion cracking occurs is identified, that is, until the leakage of the coolant is detected. Therefore, it is impossible to prevent the leakage of the coolant or the occurrence of the stress corrosion cracking.

OBJECT AND SUMMARY OF THE INVENTION

An object of the present invention is to provide a preventive maintenance method and a structure therefor which are capable of preventing occurrence of any stress corrosion cracking in a metal hollow member in an RPV.

To this end, according to one aspect of the present invention, there is provided a method for preventive maintenance an elongated metal hollow member welded to a wall of a pressure vessel of a nuclear reactor through a padding weld formed on the wall and, extending into a coolant within the pressure vessel, with the method comprising the steps of: removing the coolant out of the hollow member; smoothing an inner peripheral surface of a wall portion of the hollow member corresponding to the padding weld; locating a metal sleeve onto the inner peripheral surface of the wall portion in coaxial relation; fitting the metal sleeve onto the inner peripheral surface of the wall portion along a whole length of the metal sleeve; and heating the metal sleeve throughout to provide a molten metal portion penetrating into both of the wall portion and the metal sleeve, in which molten metal portion δ ferrite is produced.

Further, according to another aspect of the present invention, there is provided a preventive maintenance structure of an elongated metal hollow member welded to a wall of a pressure vessel of a nuclear reactor through a padding weld formed on the wall, with the metal hollow member comprising a molten metal portion at a portion of an inner peripheral surface thereof which corresponds to the padding weld, the molten metal portion penetrating into both of the wall portion and the metal sleeve and including δ ferrite.

Other objects, functions and effects of the present invention will become more clear from the description of preferred embodiments to be described below in detail with reference to the accompanying drawings.

DETAILED DESCRIPTION OF PREFERRED EMBODIMENTS

Figure 1:
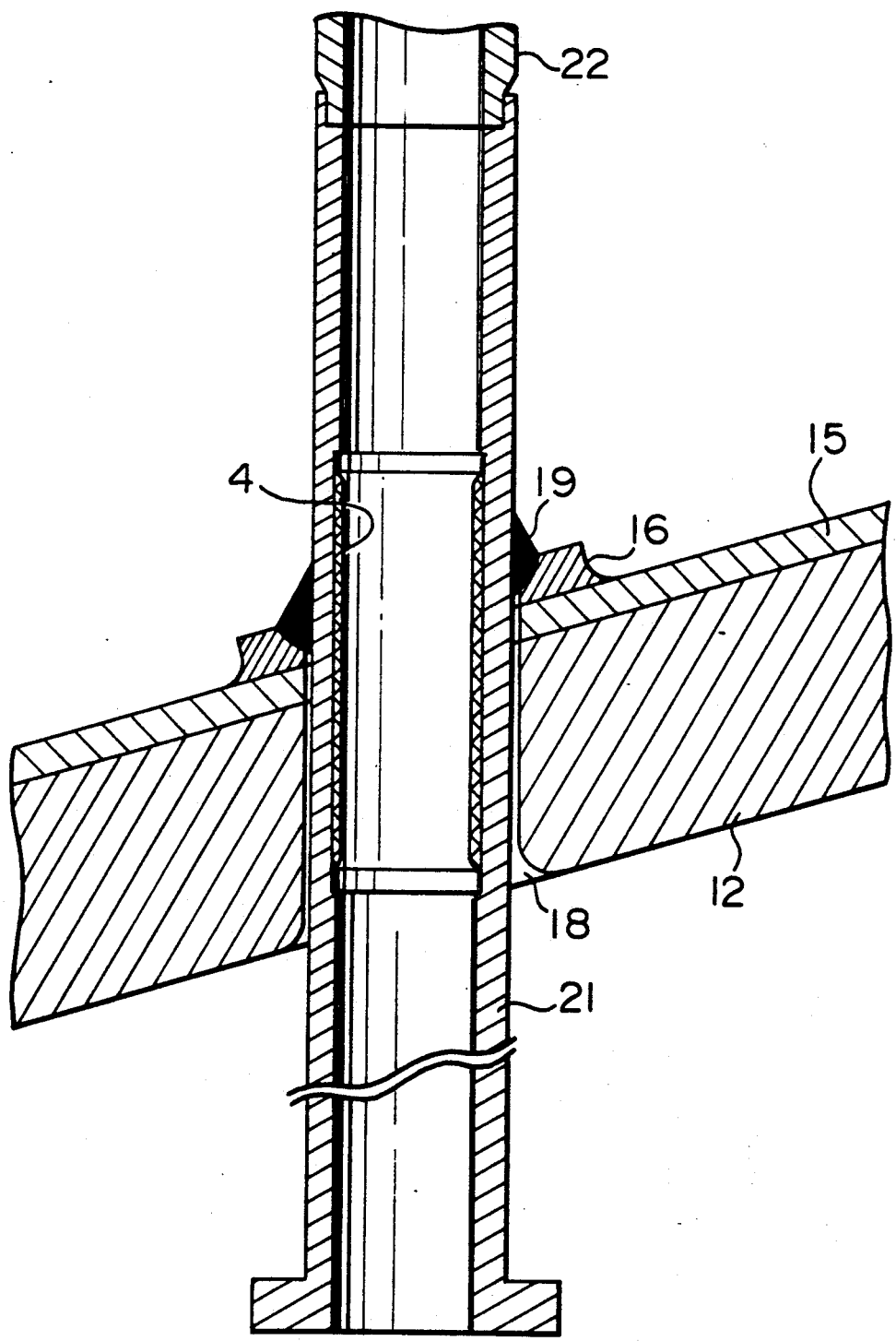
FIG. 1 is a fragmentary enlarged sectional view showing an ICM housing to which a preventive maintenance structure for stress corrosion cracking according to one embodiment of the present invention is applied.
Figure 2:
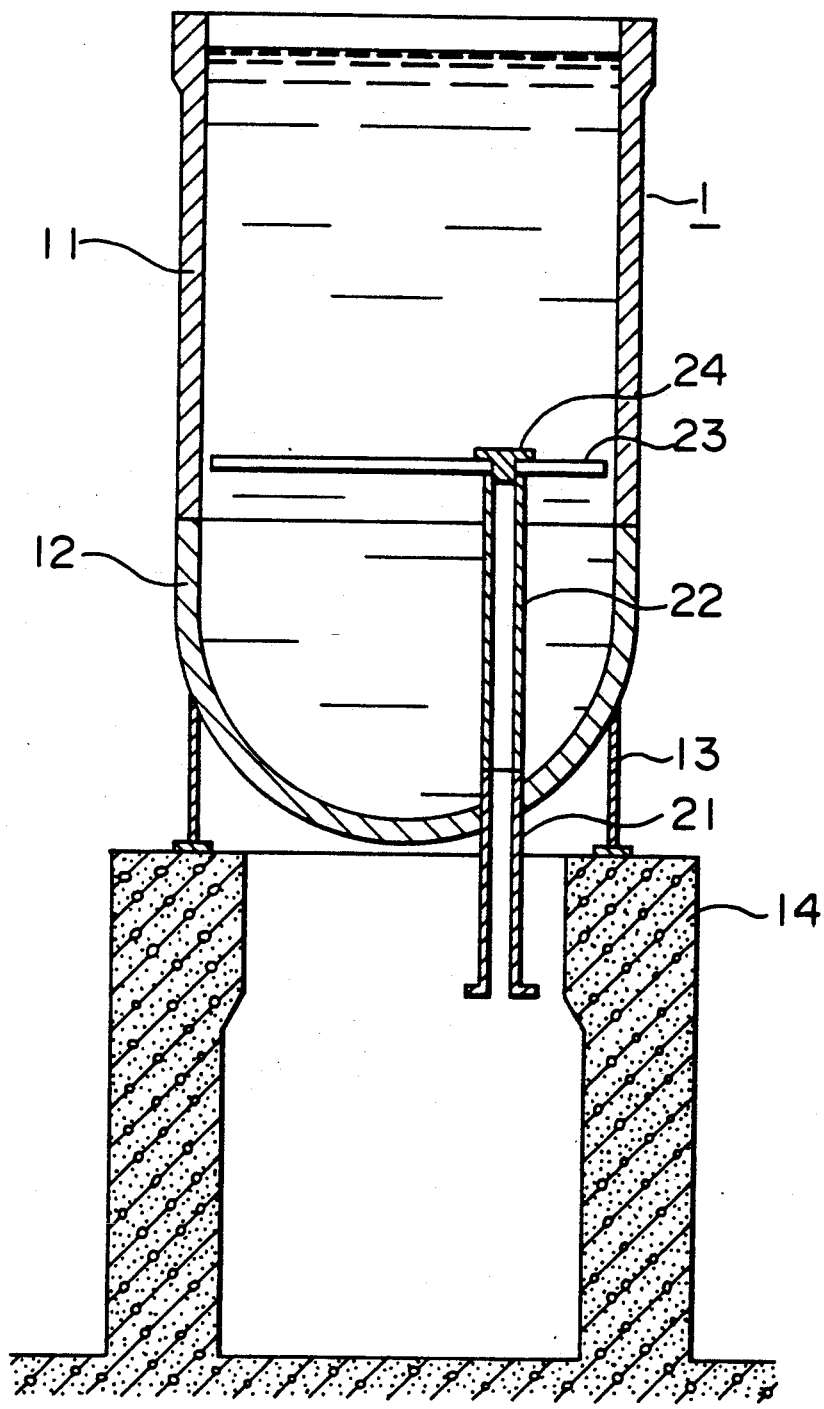
FIG. 2 is a sectional view of an RPV which employs the ICM housing of FIG. 1.

A preventive maintenance structure for stress corrosion cracking according to one embodiment of the present invention shown in FIG. 1 is applicable to an ICM housing provided in an RPV shown in FIG. 2, for example.

An RPV 1 comprises, as shown in FIG. 2, a main body 11, a bottom head plate 12 fixed to one end of the main body 11, and a top head (not shown) fixed to the other end of the main body 11. A coolant is accommodated in the RPV 1. The RPV 1 is fixedly installed on a pedestal 14 of pressure containment vessel through a skirt 13. A plurality of ICM housings 21 extend through the bottom head plate 12 into the RPV 1. In the drawing, a single ICM housing is illustrated.

As shown in FIG. 1, the bottom head plate 12 is provided on an inner peripheral surface thereof with a liner layer 15 of nickel-chromium alloy or inconel. A plurality of stubtubes 16 (only one of which is shown) are welded by buildup welding onto the linear layer 15 and separated from each other. Each ICM housing 21 extends through the bottom head plate 12, the liner layer 15 and the stubtube 16 into the RPV 1 with an annular space 18 around it. The ICM housing 21 is fixedly secured to the stubtube 16 through a weld 19. The ICM housing 21 is joined at one end thereof with one end of an ICM guide tube 22 and is usually closed at the other end thereof with a plug (not shown). The other end of the ICM guide tub 22 is joined to an opening formed in a core plate 23 disposed in the RPV 1.

Figure 3:
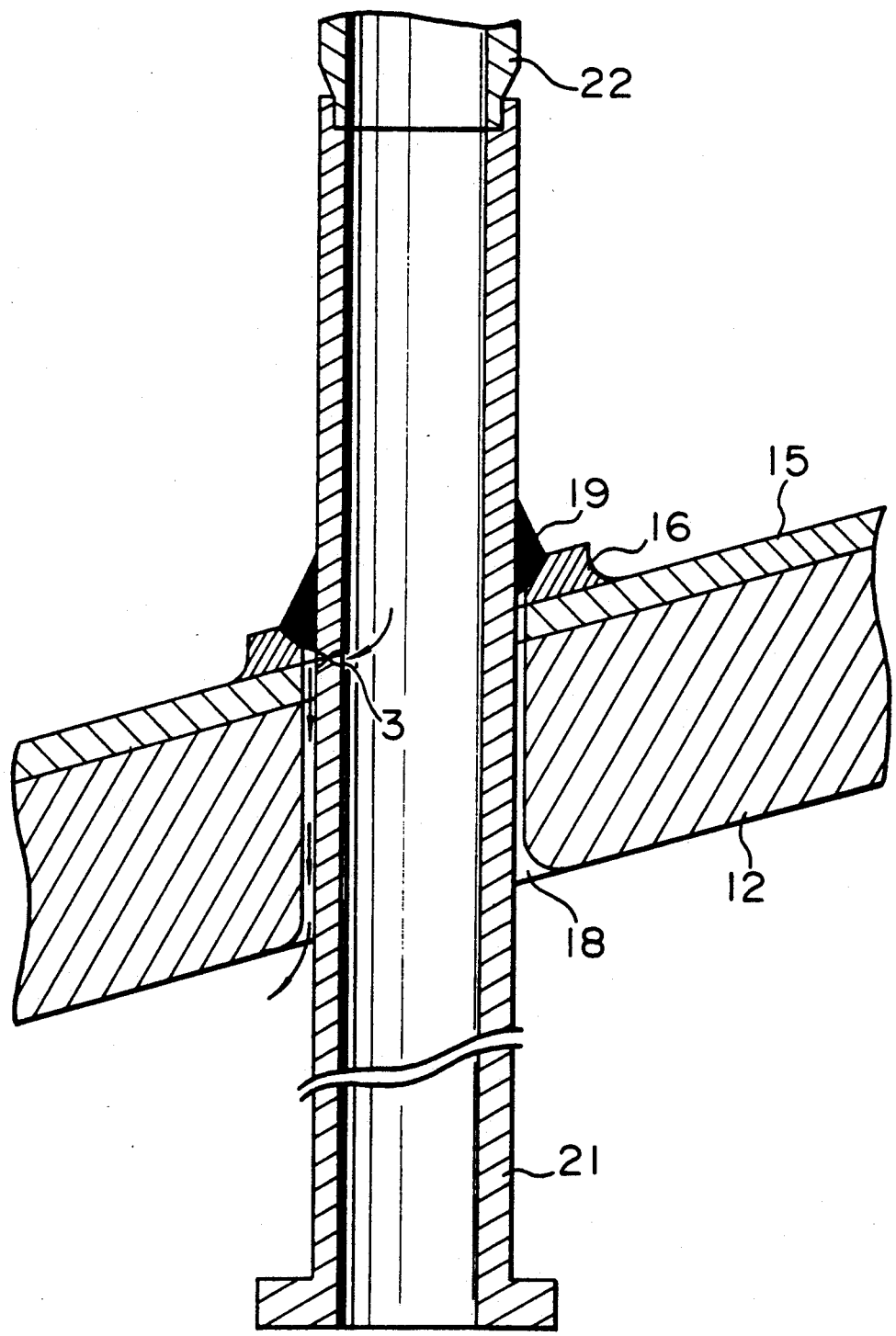
FIG. 3 is a fragmentary enlarged sectional view showing a conventional ICM housing to which no preventive maintenance structure is applied.

Previously, there has been a possibility in this kind of construction that, a as shown in FIG. 3, continuous crack 3 occurs in the ICM housing 21 at a portion thereof corresponding to the weld due to the stress corrosion crack. Once the cracking 3 has occurred, the coolant is caused to leak out of the RPV 1 through the cracking 3 and the annular space 18.

To prevent the above phenomenon, in the present embodiment, as shown in FIG. 1, the ICM housing 21 is provided at a portion of an inner peripheral surface thereof corresponding to the weld 19 with a molten metal part 4, which portion is in danger of stress corrosion cracking. The molten metal part 4 includes δ ferrite composition, content of which is 4% or more.

Figure 4:
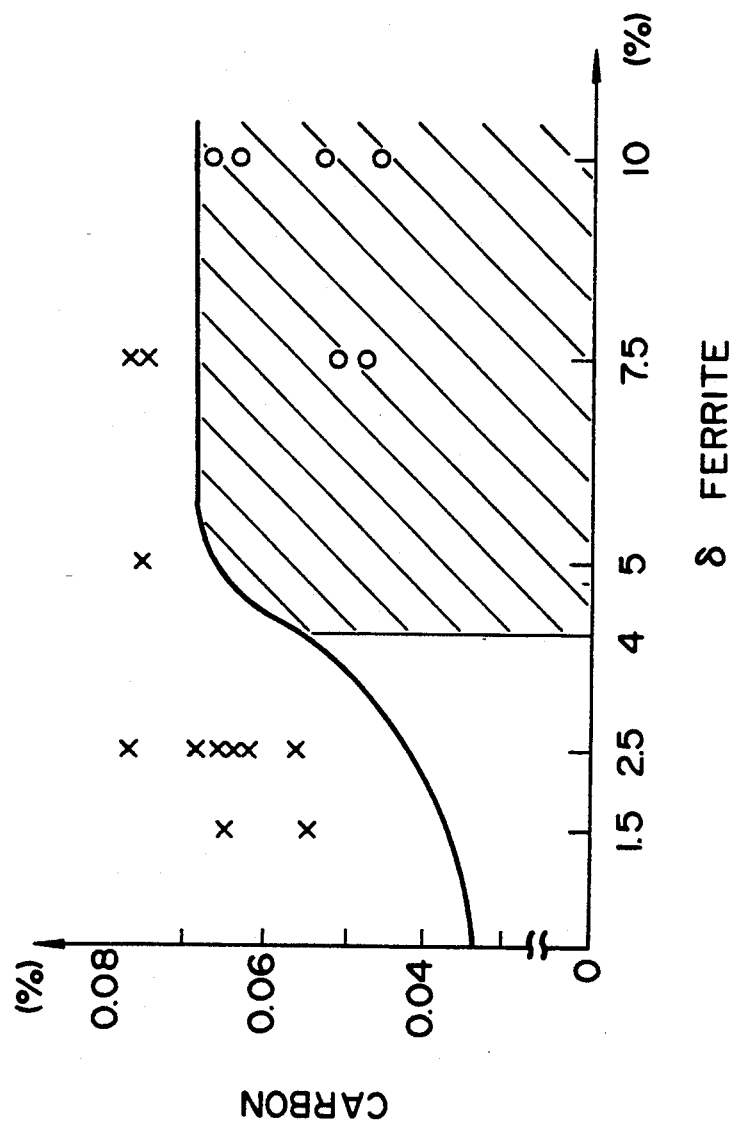
FIG. 4 is a graph showing the resistance to stress corrosion cracking.

In the FIG. 4, a cross represents a component combination in which a corrosion cracking occurs, while a circle represents a component combination in which no corrosion cracking occurs. As apparent from FIG. 4, a combination of 0.06% or less carbon and 4% or more δ ferrite, namely, within a hatched area, can prevent the occurrence of corrosion cracking. The molten metal part 4 including 4% or more δ ferrite composition has a good resisting property against the stress corrosion cracking as compared with the pure ICM housing 21 because the carbon content of the pure ICM housing, i.e. SUS 304 is about 0.07%. Therefore, occurrence of continuous cracking is suppressed, to a minimal amount so that there is very little possibility of leakage of the coolant.

Next, the procedure for the formation of the molten metal part 4 will be described with reference to FIG. 2 and FIGS. 5 to 8.

First, as shown in FIG. 2, the other end of the ICM guide tube 22 is closed by a seal cap 24. Then, the plug is removed from the other end of the ICM housing 21 to discharge the coolant out of the ICM housing 21 and the ICM guide tube 22.

Figure 5:
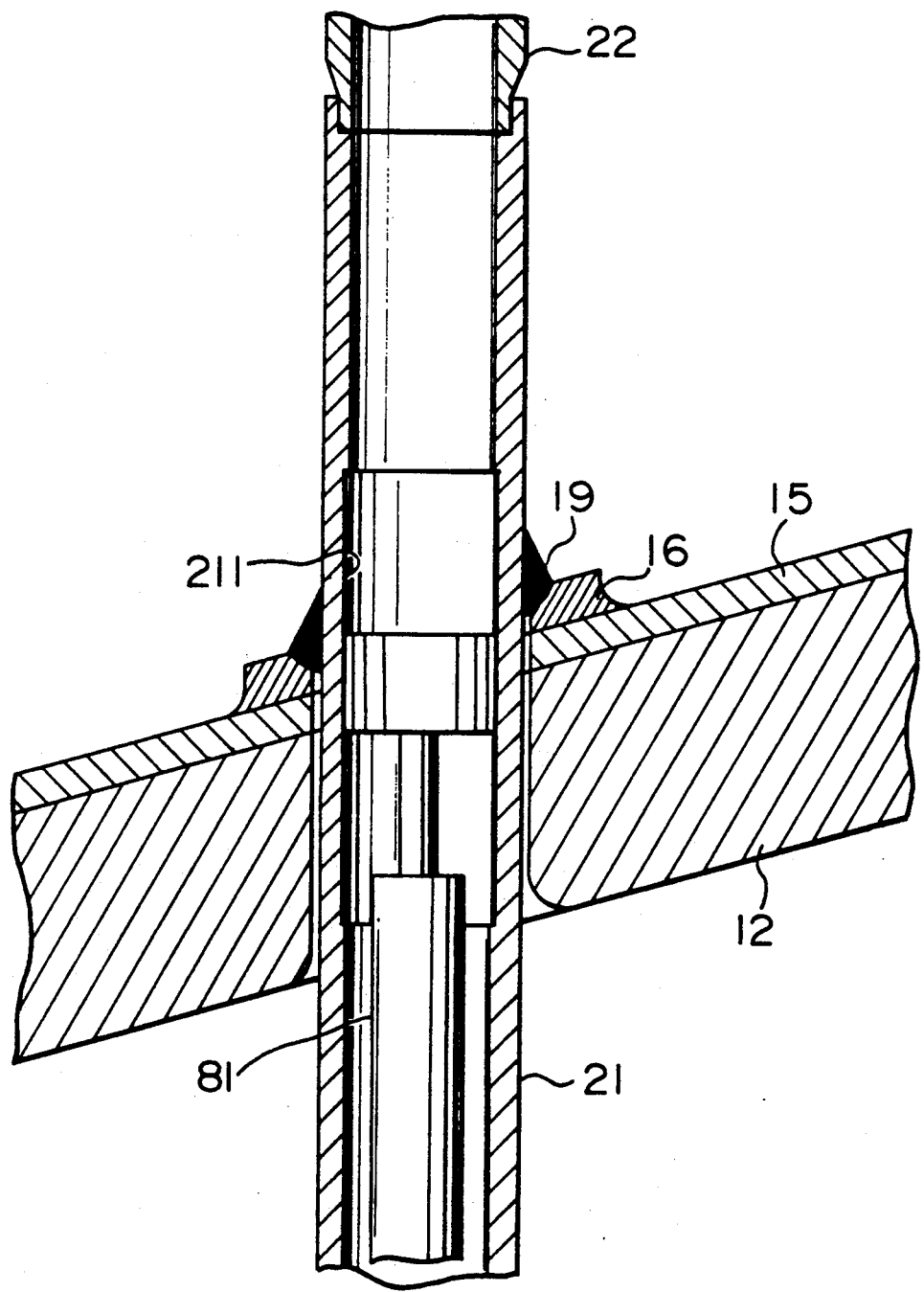
FIGS. 5 to 8 illustrate the procedure for the formation of the preventive maintenance structure for stress corrosion cracking according to the embodiment of the present invention.

Subsequently, as shown in FIG. 5, a remote-control inner surface working machine or grinder 81 is inserted into the ICM housing 21 through the other end thereof so as to smooth the inner peripheral surface of a portion 211 of the ICM housing 21 which corresponds to the weld 19.

Figure 6:
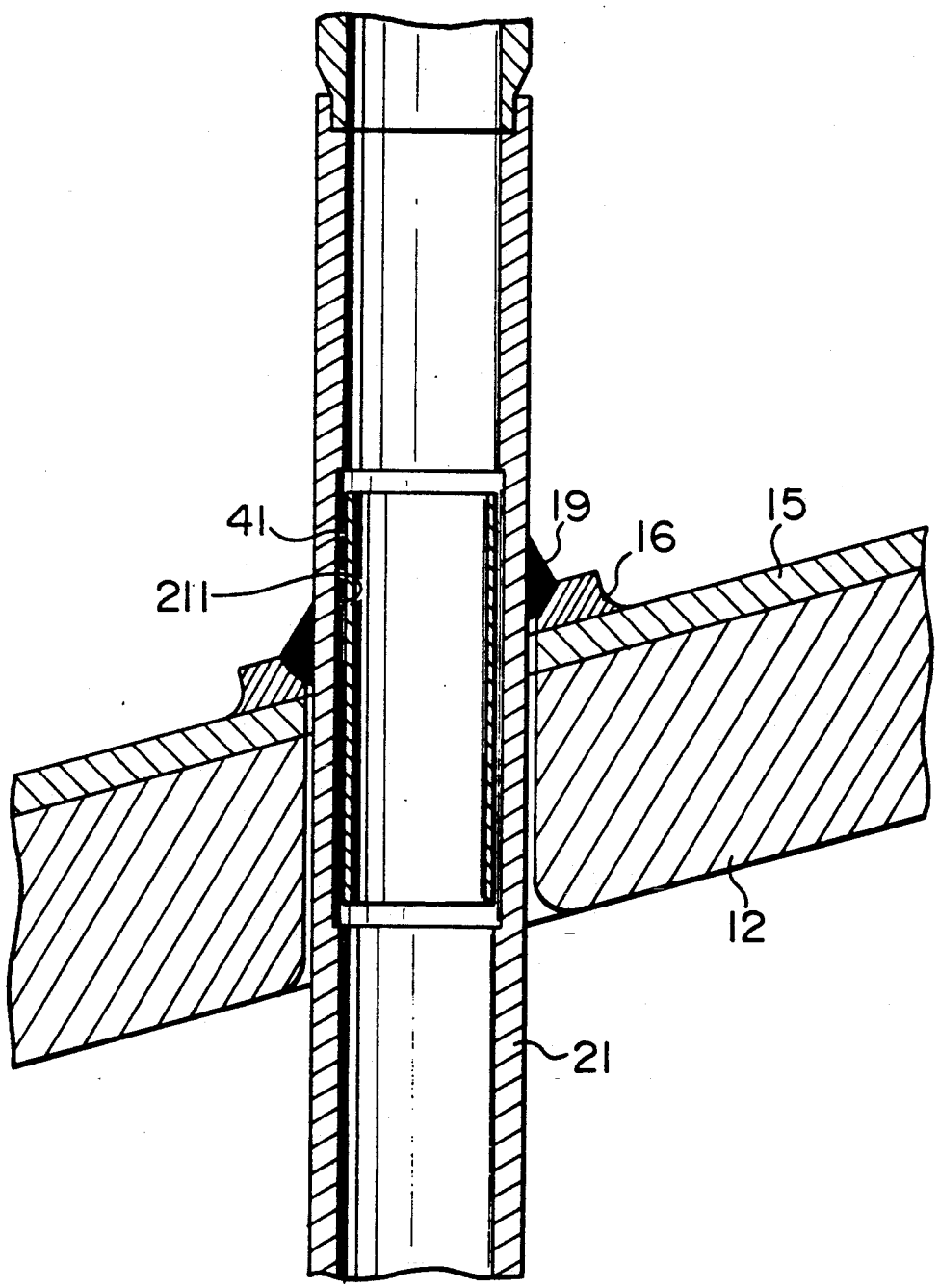

Thereafter, as shown in FIG. 6, a cylindrical sleeve 41 is set in position to the inner peripheral surface portion 211 by an inserting jig (not shown). Since the inner peripheral surface portion 211 is smoothed as mentioned before, the sleeve 41 can be inserted easily. When the sleeve 41 is applied to the ICM housing 21 of ordinary dimension, the thickness of the sleeve 41 is between 0.4 mm and 0.8 mm and more preferably 0.6 mm, with considering the easiness to handle. Further, the sleeve 41 contains less than 0.03% carbon from the viewpoint of the corrosion resistance and, in addition, contains chromium and nickel by amounts equivalent to those required to produce 4% or more δ ferrite composition when molten and mixed with the base metal SUS304. The sleeve 41 is made of a material containing the following components, such as SUS316. It is noted that the unit is weight percent.

| C | Si | Mn | P | S |
|---|---|---|---|---|
| ~0.03 | ~1.00 | ~2.00 | ~0.045 | ~0.030 |
| Ni | | Cr | | Mo |
| 12.00 ~ 15.00 | | 16.00 ~ 18.00 | | 2.00 ~ 3.00 |

Figure 7:
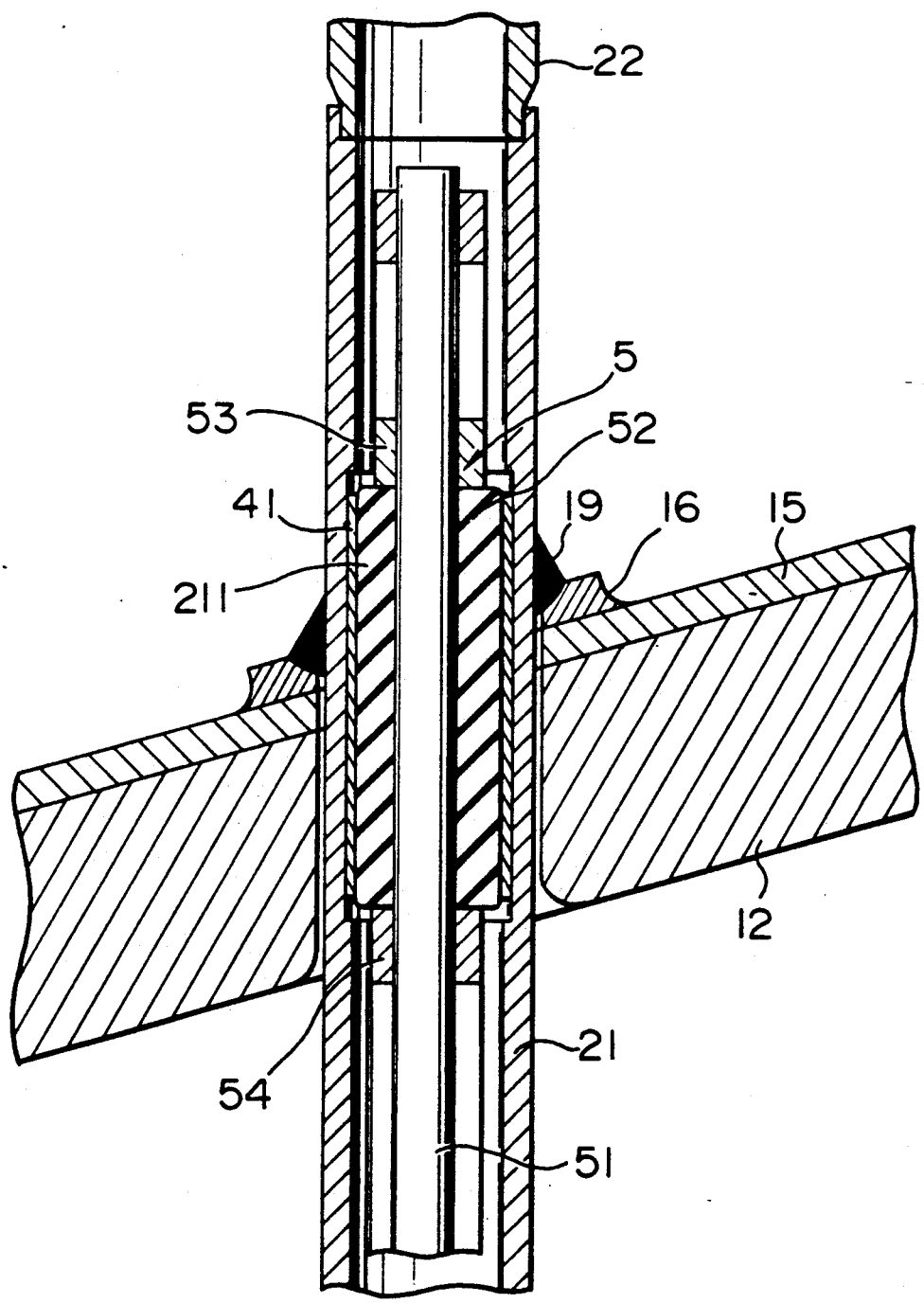

When, as shown in FIG. 7, an expander 5 is inserted into the ICM housing 21. The expander 5 comprises a stem 51, a rubber tube 52 fitted around the stem 51, and a pair of axially movable pistons 53 and 54 serving to hold the tube 52 therebetween. As the tube 52 is positioned in alignment with the sleeve 41, the pair of pistons 53 and 54 are moved to close to each other so that the rubber tube 52 is axially compressed and radially expanded As a result, the sleeve 41 is plastically deformed to be uniformly press-fitted to the inner peripheral surface portion 211 of the ICM housing 21 over the entire surface of the sleeve 41.

Figure 8:
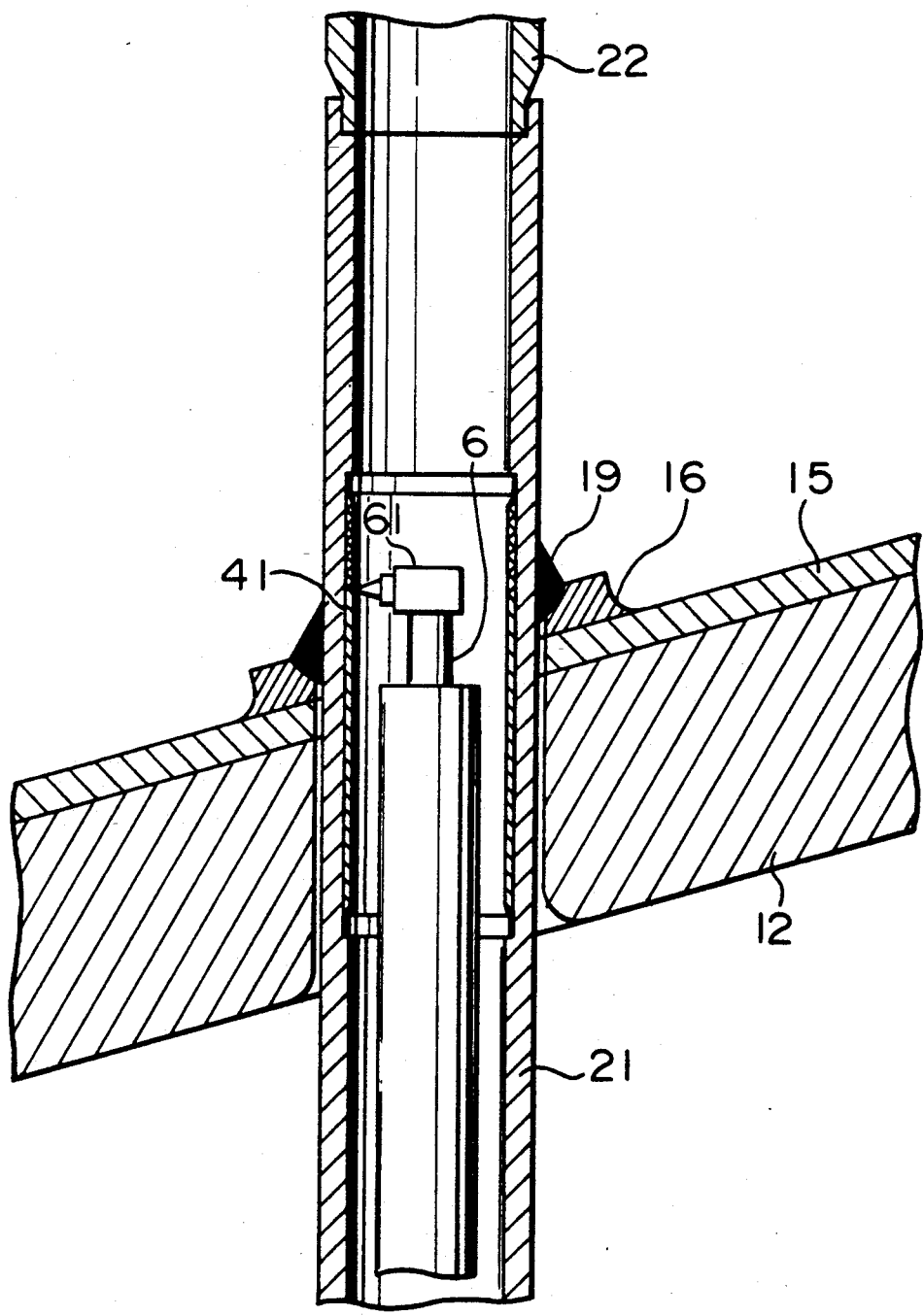

Finally, as shown in FIG. 8, a head 61 of a remote-control non-filler type tungsten inert gas arc welder or a TIG welder 6 is inserted into the ICM housing 21 through the other end of the ICM housing 21. The head 61 is rotated and moved along the whole axial length of the sleeve 41 to melt the sleeve 41 throughout. In this case, axially opposite ends of the sleeve 41 are molten with low heat input for the purpose of preventing sensitization due to thermal effect. Since the sleeve 41 has already been deformed plastically to a certain extent, the sleeve is deformed very little in the welding operation, thus contributing to a good melting performance.

Consequently, the sleeve 41 and a portion of the inner surface of the ICM housing 21 are molten together to form on the inner surface of the ICM housing 21 the molten metal part 4 which includes 4% or more δ ferrite composition and has a good resisting property against the stress corrosion cracking. Results of metal component analysis of the molten metal part 4 formed in accordance with the present embodiment in which the welding heat input is 3.1 KJ/cm and the pitch of axial movement of a torch is 1.5 mm are as follows. It is noted that the point of measurement is located 0.5 mm radially outward from the inner peripheral surface and the unit is weight percent.

| C | Si | Mn | Ni | Cr | Mo | δ-ferrite |
|---|---|---|---|---|---|---|
| 0.020 | 0.38 | 1.36 | 12.49 | 18.74 | 106 | 4.9 |

TIG welding is used for melting the sleeve 41 in the present embodiment, and however, other welding methods or laser can be used as well. In the present embodiment, welding of the sleeve or heating thereof is conducted with cooling the ICM housing 21 from the outside thereof by coolant. Namely, a heat sink welding is conducted. According this the residual stress in the ICM housing 21 is suppressed and sensitization of the sleeve 41 is also suppressed, thereby obtaining a higher resistance against the stress corrosion cracking.

Figure 9:
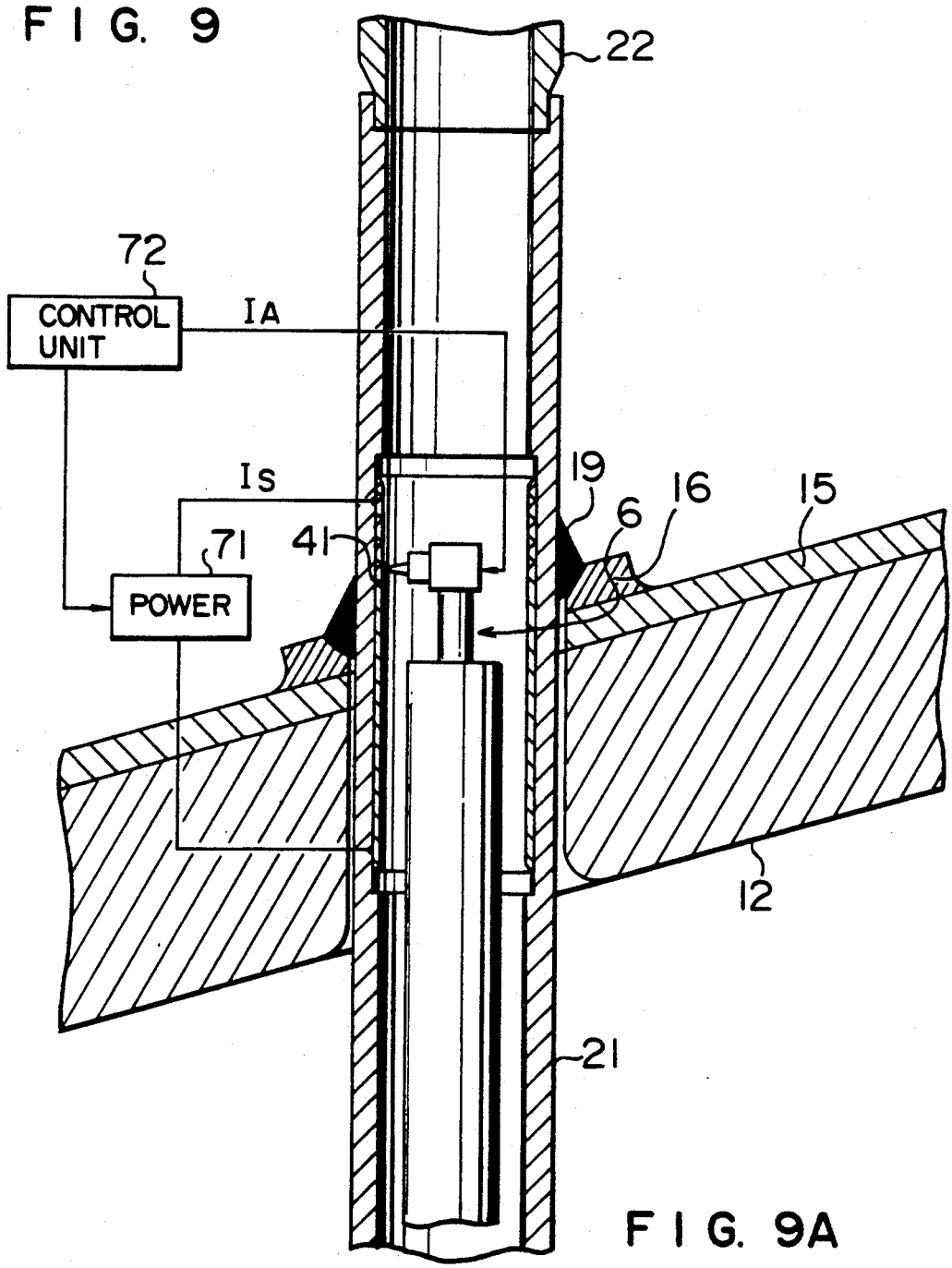
FIG. 9 is a fragmentary enlarged sectional view showing an ICM housing according to another embodiment of the present invention.
Figure 9A:
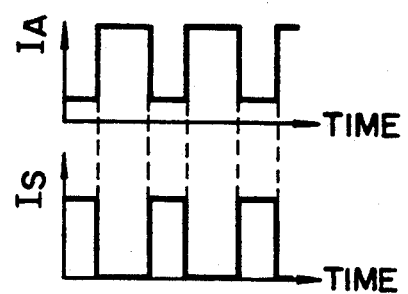
FIG. 9A is a graph showing the timing to supply electric current to a sleeve.

In another embodiment shown in FIG. 9, in order to press-fit the sleeve 41 to the inner peripheral surface portion 211 of the ICM housing 21, thermal expansion of the sleeve 41 is utilized in place of using the expander 5.

More specifically, a power source 71 is provided to supply electric current (sleeve current) to both ends of the sleeve 41 and, in addition, a control unit 72 is provided to control the power source 71. The control unit 72 serves to control the welder 6 in such a manner that the welder 6 is supplied with pulses of current (arc current) $I_A$ intermittently as well as to control the power source 71 in such a manner that the sleeve 41 is supplied with pulses of sleeve current $I_S$ in inverted relation to the arc current $I_A$. The sleeve current causes the sleeve 41 to thermally expand to be uniformly press-fitted to the inner peripheral surface portion 211 of the ICM housing 21 over the entire surface thereof.

Furthermore, the sleeve 41 is heated with the sleeve current so that the efficiency of melting is improved and the penetration is increased. It is therefore possible to operate with smaller heat input value in total, resulting in that the ICM housing 21 can be restricted from being sensitized due to heat input.

It is easily understood that the above procedure is applicable to the CRD housing as well.

What is claimed is:

1. A method for preventive maintenance of an elongated metal hollow member welded to a wall of a pressure vessel of a nuclear reactor through a padding weld formed on said wall and extending into a coolant within said pressure vessel, said method comprising the steps of:
   removing said coolant from said hollow member;
   smoothing an inner peripheral surface of a wall portion of said hollow member corresponding to said padding weld;
   locating a stainless steel sleeve on said inner peripheral surface of said wall portion in a coaxial relationship;
   fitting said sleeve onto said inner peripheral surface of said wall portion along an entire length of said sleeve; and
   heating said sleeve through so as to produce a 4% by wt. or more $\delta$ ferrite molten metal portion penetrating into both said wall portion and said metal sleeve.

2. A method according to claim 1, wherein the step of heating is conducted by an electric arc welding.

3. A method according to claim 2, wherein the step of heating is conducted by heat sink welding.

4. A method according to claim 1, wherein the step of heating is carried out while cooling said wall portion.

5. A method according to claim 4, wherein said cooling is conducted by said coolant within said pressure vessel.

6. A method according to claim 2, wherein the step of heating is conducted using a non-filler tungsten inert gas welding machine.

7. A method according to claim 2, wherein said fitting of said sleeve is conducted by intermittently supplying current to said metal sleeve, thereby expanding with heat an outer periphery of said sleeve to fit said sleeve into said wall portion of said hollow member, and wherein said heating is conducted by supplying current to an electric arc welding machine in an inverted relationship to said current supplied to said sleeve.

8. A method according to claim 1, wherein the step of fitting of said sleeve includes enlarging said sleeve radially outwardly.

9. A preventive maintenance structure of an elongated metal hollow member welded to a wall of a pressure vessel of a nuclear reactor through a padding weld formed on said wall, a stainless steel sleeve fitted to an internal surface of said metal hollow member, and a 4% by wt. or more $\delta$ ferrite molten metal portion provided at a portion of an inner peripheral surface of said hollow member which corresponds to said padding weld, wherein said molten metal portion penetrates into both said wall portion and said sleeve.

* * * * *